Jan. 28, 1930. H. M. RUSSELL 1,745,060
METHOD OF MAKING BOX PARTITIONING
Filed Dec. 17, 1928  2 Sheets-Sheet 1
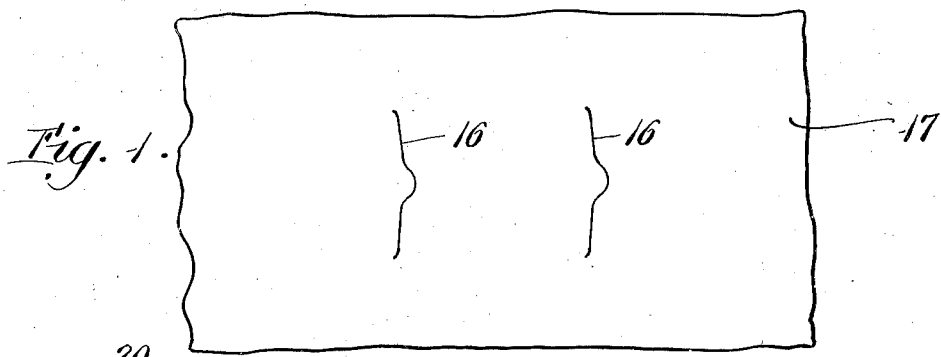
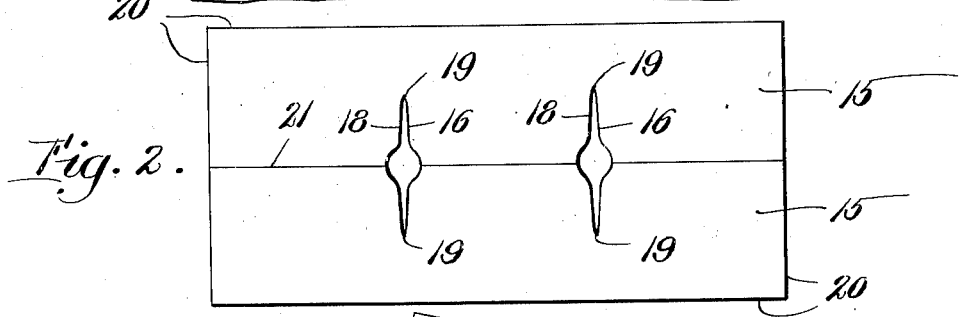
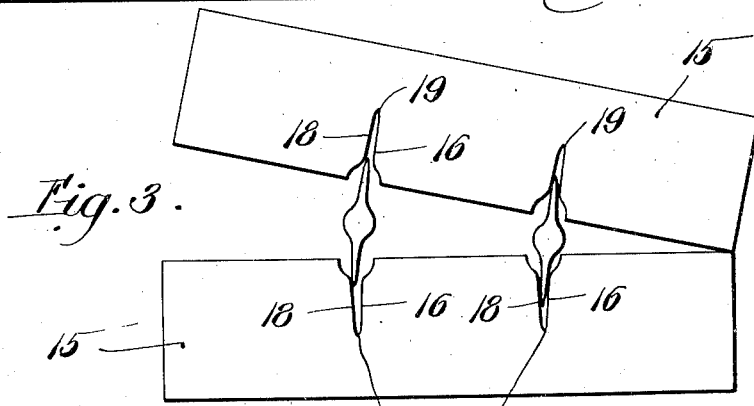
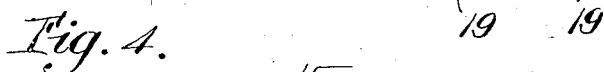
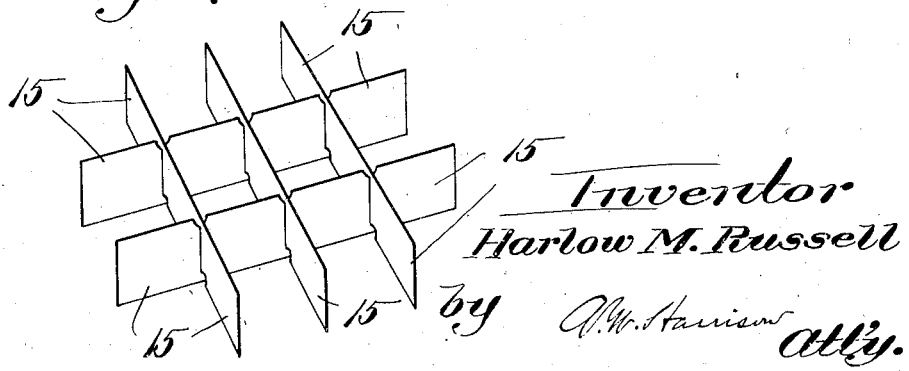
Inventor
Harlow M. Russell Jan. 28, 1930.  H. M. RUSSELL  1,745,060
METHOD OF MAKING BOX PARTITIONING
Filed Dec. 17, 1928  2 Sheets-Sheet 2
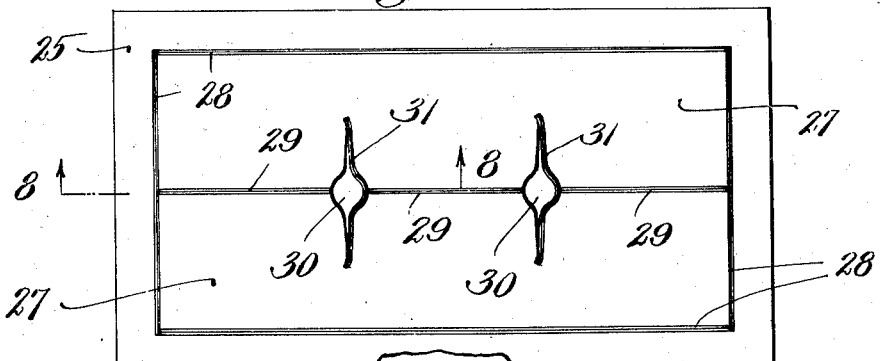
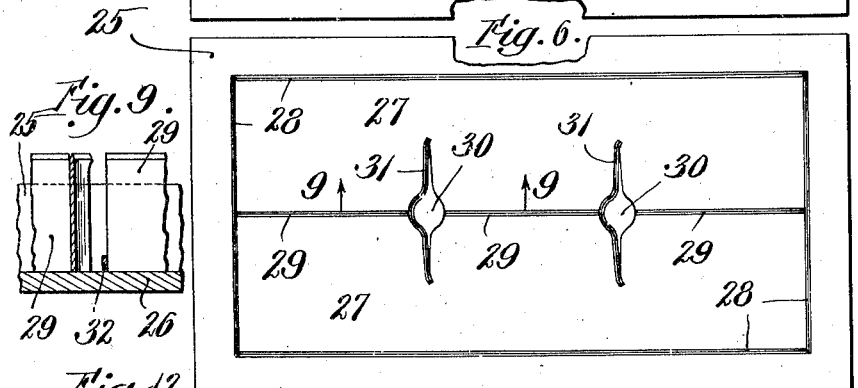
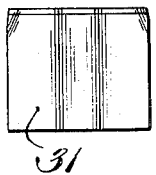
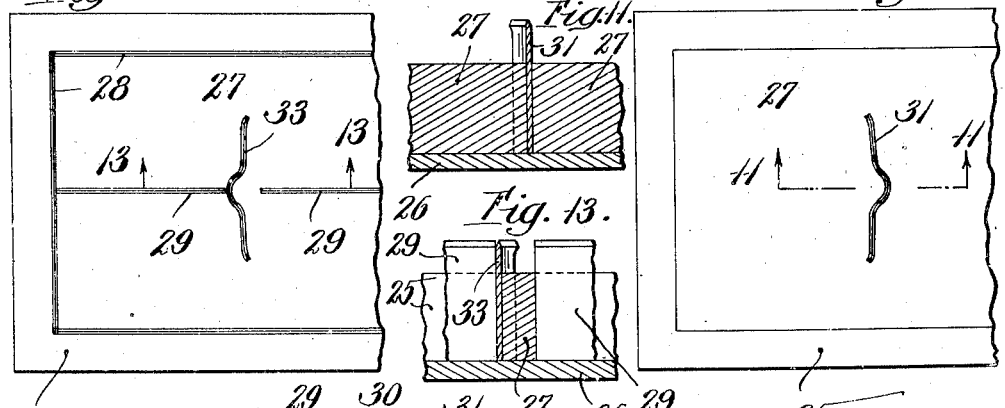
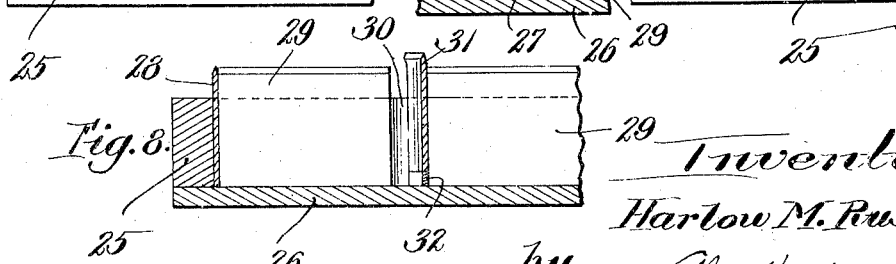

Patented Jan. 28, 1930

1,745,060

UNITED STATES PATENT OFFICE

HARLOW M. RUSSELL, OF CHELSEA, MASSACHUSETTS

METHOD OF MAKING BOX PARTITIONING

Application filed December 17, 1928. Serial No. 326,628.

This invention relates to the manufacture of strips known as dividers or partitioning employed for the purpose of providing cells or pockets in cartons or other containers for articles such as eggs.

One of the methods heretofore employed in making the strips is to cut the material, which is commonly known as chip board, into strips of certain sizes, and then, in order to make edge slots therein, to bunch the strips and pass the edges of the bunch of strips over a circular saw.

Another method is to employ rotary slotting knives for cutting into the edges of the strips; but under this method as well as when circular saws are employed, the slots are of uniform width throughout and the sides of the slots are parallel and have no diverging mouths to facilitate the assemblage of a plurality of the strips in crosswise relationship for the purpose of providing cells or pockets.

Another method is to employ special shapes of dies which cut slots having interlocking tooth formations. Such dies are expensive, and the removal of the cut out pieces of the chip board material is not easy to accomplish.

Another method has been to cut the slots by means of single knives, not removing any of the material. This is not practical with any but quite thin material, and besides, there is no clearance or actual space between the sides of such slots which are merely slits, and consequently the interengagement of strips which cross each other causes crowding at the intersections, tending to distortion of the shape of the cells which are to hold the eggs or other articles. If two knives are employed for this purpose, close together, they can not be so relatively positioned as to form or present a satisfactory clearance, and removal of the pieces between the two cuts can not be easily effected.

The object of my invention is to provide an improved method of producing strips of partitioning material with slots in the edges which are all alike whether to be employed longitudinally or laterally in a carton, and which slots can be easily caused to interengage, and so that crosswise assembled strips will remain interengaged without needing any interlocking teeth or shoulder portions.

With the above object in view, my invention consists in the method substantially as hereinafter described and claimed.

Of the accompanying drawings:

Figures 1, 2 and 3 are plan views illustrating successive steps in the operation of making the strips.

Figure 4 is a perspective view of a group of the strips assembled for use in a container.

Figure 5 is a plan view of an assemblage of cutters which may be employed in carrying out my invention.

Figure 6 is a view similar to Figure 5, but illustrating two of the knives in the positions to which they are shifted for the second cutting operation.

Figure 7 is an elevation of one of the knives.

Figure 8 represents a section on line 8—8 of Figure 5.

Figure 9 represents a section on line 9—9 of Figure 6.

Figure 10 is a plan view of a portion of a die which may be employed for the first cutting operation.

Figure 11 represents a section on line 11—11 of Figure 10.

Figure 12 is a plan view of a portion of a die which may be employed for the second cutting operation.

Figure 13 represents a section on line 13—13 of Figure 12.

Similar reference characters designate similar parts or features in all of the views.

To make dividers or partitioning strips as shown at 15 in Figures 3 and 4, the improved method consists in first forming a plurality of single, properly spaced, cuts such as illustrated at 16 in Figure 1, in a web or any size sheet of paper material such as chip board, and then effecting a second cutting operation which is more extensive than the first cutting, said second operation not only forming cuts 18 adjacent to the first-formed cuts 16 and communicating therewith at their ends or tips 19, but also forming marginal cuts 20 which serve to bound the completed articles and a longitudinal cut 21 which joins the cuts 16, 18, at the mid-length of the latter. This second operation results in simultaneously cutting from the web or sheet 17 two complete partition strips as illustrated by Figure 2, which two strips are readily separated from each other as illustrated by Figure 3, each strip having a plurality of slots capable of being interengaged with similar slots in other crossing strips as illustrated by Figure 4. When the strips are converted from the Figure 2 condition to the Figure 3 condition, the small pieces which are separated by the cooperating cuts 16, 18, either drop out or are easily removed as by stripping or plucking, leaving the slots free or open, the opposite edges of the slots being smooth and just far enough apart to provide the proper clearance for the thickness of crossing strips when a plurality of the strips are assembled as illustrated by Figure 4.

While most of the figures of the drawings illustrate the making of strips each having two edge slots, it is to be understood that the same operation may be carried out for the making of strips of any length and having three or more edge slots.

While the method described may be carried out manually, employing suitably shaped hand implements for effecting the cutting, it is preferable for the sake of economy in production to employ more or less machinery. For instance, a sheet or web of the chip board material may be run through a cutting press of any well-known type, which press is provided with a die or dies consisting of a chase such as used in a printing press, in which chase the cutting knives are locked up in a manner similar to the locking up of the type in a chase carried by a printing press.

As illustrated by Figures 5, 6 and 8, the chase includes a frame 25, bottom 26, and a suitable filling blocks at 27. In said chase there are fixedly secured four straight knives 28 in relative positions to form a rectangle, and three straight knives 29 which extend along the mid-width of the chase and are separated from each other at the openings or spaces 30 in the chase.

Removably and shiftably mounted in each of the spaces 30 is a knife 31 which, in the form illustrated by Figures 5, 7 and 8, is of the same height as the knives 28, 29. In order that the device illustrated by Figure 5 may be first employed for making only the cuts 16 (Fig. 1) in a sheet 17 of the material, each knife 31, when at one side of the space 30, is mounted so as to project above the plane of the other knives. Such elevation of the knives 31 is ensured by providing under each of them a member 32 either integral with the bottom 26 of the chase or a separate member mounted on said bottom, (Fig. 8), which member 32 conforms to the shape of the lower edge of the knife and is hereinafter referred to as the supporter for the knife. When the knives 31 are in the positions illustrated by Figure 5, their cutting edges are above the plane of the tops of the knives 28, 29, as illustrated by Figure 8 and therefore if the chase with its knives is mounted in a press and a sheet or web of material is acted upon in the ordinary way, only the cuts 16 (Fig. 1) will be made. Any required succession of such pair of cuts will be made in the sheet or web or may be made, before the second operation now to be described is effected.

By shifting the knives 31 to the other side of the spaces 30, (Fig. 6), said knives will automatically assume a lower position (Fig. 9) since they will then bear on the bottom 26 of the chase at one side of the supports 32, and their cutting edges will be in the same plane as the cutting edges of the margin knives 28 and the dividing knives 29. Then the material having the preliminary cuts 16 will be run through the press a second time, properly registered of course relatively to the timing of operation of the die and its knives, with the result of making the cuts 18 (Fig. 2) and at the same time making the bounding cuts 20 and the dividing cuts 21. This produces a pair of strips 15 (Fig. 2) ready to be separated as illustrated by Figure 3, the pieces which are cut out by the cooperating, although successively made, cuts 16, 18, readily falling out or capable of being shook out or brushed out.

By the above described method of successive cutting, I am able to make the slots with clean cut margins, and of exactly the right width to provide the proper clearance for such crosswise assemblages as illustrated by Figure 4.

The shape of the knives 31 as illustrated is such that the mouths of the edge slots are widened, this being preferable as it facilitates slipping of the group of strips 15 into interengagement as illustrated by Figure 4, this being a special advantage when the assembling is done by automatic machinery. I do not limit myself however to the specific shape of the knives as illustrated.

Instead of employing a single die such as illustrated by Figures 5 and 6, and shifting the positions of the knives 31 as has been described, I may employ two separate dies and use them successively. For instance, Figures 10 and 11 illustrate a portion of a die similar to that illustrated by Figure 5 but only having a requisite number of permanently mounted knives 31 for making the cuts 16 during the preliminary hand or machine-made operation. For the second operation I may then employ the die illustrated by Figures 12 and 13, such die having the margin knives 28 and the dividing knives 29 and also having the requisite number of dies 33 in permanent positions to effect the completion of the cutting or dieing operations in the same manner as has been described in connection with Figures 5, 6, 7, 8 and 9.

Having now described my invention, I claim:

1. In the operation of making box-partitioning strips, the improved method comprising forming a plurality of single spaced cuts in sheet material in side-by-side parallel relationship in one stage of the operation, and then in a second stage of operation forming a second plurality of oppositely disposed cuts complementary to the first-formed cuts to complete the cut-outs, and forming a dividing cut intersecting the aforesaid cuts.

2. The process as defined in claim 1, further characterized by forming bounding cuts to provide a pair of strips.

In testimony whereof I have affixed my signature.

HARLOW M. RUSSELL.